(12) United States Patent
Suzuki

(10) Patent No.: US 11,682,999 B2
(45) Date of Patent: Jun. 20, 2023

(54) MOTOR CONTROL METHOD, MOTOR CONTROL MODEL CONVERSION METHOD, MOTOR CONTROL SYSTEM, MOTOR CONTROL MODEL CONVERSION SYSTEM, AND MOTOR CONTROL MODEL CONVERSION PROGRAM

(71) Applicant: Panasonic Intellectual Property Management Co., Ltd., Osaka (JP)

(72) Inventor: Ken'ichi Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 17/438,126

(22) PCT Filed: Jan. 6, 2020

(86) PCT No.: PCT/JP2020/000077
§ 371 (c)(1),
(2) Date: Sep. 10, 2021

(87) PCT Pub. No.: WO2020/188956
PCT Pub. Date: Sep. 24, 2020

(65) Prior Publication Data
US 2022/0166364 A1    May 26, 2022

(30) Foreign Application Priority Data
Mar. 19, 2019  (JP) .............................. JP2019-051810

(51) Int. Cl.
*H02P 29/00*    (2016.01)
*G05D 13/62*    (2006.01)
*H02P 31/00*    (2006.01)

(52) U.S. Cl.
CPC ............. *H02P 29/00* (2013.01); *G05D 13/62* (2013.01); *H02P 31/00* (2013.01)

(58) Field of Classification Search
CPC ...... H02P 29/00; H02P 31/00; H02P 21/0014; H02P 23/0018; G05D 13/62; G05B 13/027; G05B 19/0426
(Continued)

(56) References Cited

U.S. PATENT DOCUMENTS

| 5,475,291 A | 12/1995 | Yoshida et al. |
| 10,022,959 B2 * | 7/2018 | Inoue ..................... B41J 19/202 |
| 2015/0278641 A1 | 10/2015 | Agrawal et al. |

FOREIGN PATENT DOCUMENTS

| JP | 6-266404 | 9/1994 |
| JP | 6-319284 | 11/1994 |

(Continued)

OTHER PUBLICATIONS

International Search Report of PCT application No. PCT/JP2020/000077 dated Mar. 3, 2020.
(Continued)

*Primary Examiner* — David Luo
(74) *Attorney, Agent, or Firm* — WHDA, LLP

(57) ABSTRACT

A motor control method inputs one or more controlled variables or target values each representing a state of a motor to one or more node layers as an input value, and performs calculation in each of the one or more node layers to output one or more manipulated variables used for control of the motor and control the motor in accordance with the one or more manipulated variables. Each the one or more node layers has a plurality of nodes that execute calculations in parallel. Each of the plurality of nodes multiplies the input value by a coefficient specified for the corresponding node, and performs calculation using a function specified for the (Continued)

corresponding node and designating a multiplied value as an input variable to determine an output value.

11 Claims, 10 Drawing Sheets

(58) Field of Classification Search
USPC .................................................. 318/671, 560
See application file for complete search history.

(56) References Cited

FOREIGN PATENT DOCUMENTS

| | | |
|---|---|---|
| JP | 10-003301 | 1/1998 |
| JP | 2005-267039 | 9/2005 |
| JP | 2018-186610 | 11/2018 |

OTHER PUBLICATIONS

Extended (Supplementary) European Search Report dated Apr. 7, 2022, issued in counterpart EP application No. 20773637.2. (13 pages).

Kulawski et al., "Stable adaptive control with recurrent networks", Automatica, 2000, vol. 36, No. 1, pp. 5-22, cited in EP Extended European Search Report dated Apr. 7, 2022. (18 pages).

Deng et al., "A B-spline network based neural controller for power electronic applications", Neurocomputing, 2010, vol. 73, No. 4-6, pp. 593-601, cited in EP Extended European Search Report dated Apr. 7, 2022. (9 pages).

Ashrafzadeh et al., "A novel neural network controller and its efficient DSP implementation for vector-controlled induction motor drives", IEEE Transactions on Industry Applications, 2003, vol. 39, No. 6, pp. 1622-1629, cited in EP Extended European Search Report dated Apr. 7, 2022. (8 pages).

* cited by examiner

MOTOR CONTROL METHOD, MOTOR CONTROL MODEL CONVERSION METHOD, MOTOR CONTROL SYSTEM, MOTOR CONTROL MODEL CONVERSION SYSTEM, AND MOTOR CONTROL MODEL CONVERSION PROGRAM

TECHNICAL FIELD

The present disclosure relates to a motor control method, a motor control model conversion method, a motor control system, a motor control model conversion system, and a motor control model conversion program. More specifically, the present disclosure relates to a motor control method, a motor control model conversion method, a motor control system, a motor control model conversion system, and a motor control model conversion program based on one or more controlled variables or target values of a motor.

BACKGROUND ART

PTL 1 discloses a servomotor control system. This servomotor control system includes at least one of a position closed loop control system and a speed closed loop control system. The position closed loop control system sends a drive command to a servomotor to achieve such driving that an error between rotation position information detected from the servomotor and a rotation position command sent from a controller decreases. The speed closed loop control system sends a drive command to the servomotor such that an error between rotation speed information obtained by differentiating captured rotation position information and a rotation speed command sent from the controller becomes smaller.

CITATION LIST

Patent Literature

PTL 1: Unexamined Japanese Patent Publication No. H6-319284

SUMMARY OF THE INVENTION

An object of the present disclosure is to provide a motor control method, a motor control model conversion method, a motor control system, a motor control model conversion system, a motor control model conversion program each capable of reducing a response time to a command given to control a motor.

A motor control method according to one aspect of the present disclosure inputs one or more controlled variables or target values each representing a state of a motor to one or more node layers as an input value, and performs calculation in each of the one or more node layers to output one or more manipulated variables used for control of the motor and control the motor in accordance with the one or more manipulated variables. Each the one or more node layers has a plurality of nodes that execute calculations in parallel. Each of the plurality of nodes multiplies the input value by a coefficient specified for the corresponding node, and performs calculation using a function specified for the corresponding node and designating a multiplied value as an input variable to determine an output value.

The motor control model conversion method according to the one aspect of the present disclosure is a conversion method for converting the first calculation model into the second calculation model. The first calculation model outputs the one or more manipulated variables used for control of the motor by receiving an input of the one or more controlled variables or target values each indicating the state of the motor, and performing calculation that uses one or more transfer functions or state equations. The second calculation model outputs the one or more manipulated variables by receiving an input of the one or more controlled variables or target values, and performing calculation in each of the one or more node layers each including a plurality of nodes that execute calculations in parallel. In a step of converting the first calculation model into the second calculation model, this conversion method determines a coefficient multiplied by an input value input to the nodes, and a function designating a multiplied value as an input variable based on the one or more transfer functions or state equations for each of the plurality of nodes.

A motor control system according to one aspect of the present disclosure includes an inputter and a calculator. One or more controlled variables or target values each representing a state of a motor are input to the inputter as an input value. The calculator includes one or more node layers each having a plurality of nodes that execute calculations in parallel, and outputs one or more manipulated variables used for control of the motor by performing calculation based on the input value. Each of the plurality of nodes multiplies the input value by a coefficient specified for the corresponding node, and performs calculation using a function specified for the corresponding node and designating a multiplied value as an input variable.

A motor control model conversion system according to one aspect of the present disclosure includes a model inputter and a converter. A first calculation model is input to the model inputter. The converter converts the first calculation model into a second calculation model, and outputs the second calculation model. The first calculation model outputs the one or more manipulated variables used for control of the motor by receiving an input of the one or more controlled variables or target values each indicating the state of the motor, and performing calculation that uses one or more transfer functions or state equations. The second calculation model outputs the one or more manipulated variables by receiving an input of the one or more controlled variables or target values, and performing calculation in each of the one or more node layers each including a plurality of nodes that execute calculations in parallel. In a step of converting the first calculation model into the second calculation model, the converter determines a coefficient multiplied by an input value input to the nodes, and a function designating a multiplied value as an input variable based on the one or more transfer functions or state equations for each of the plurality of nodes.

A motor control model conversion program is a conversion program for causing one or more processors to execute a conversion process that converts a first calculation model into a second calculation model. The first calculation model outputs the one or more manipulated variables used for control of the motor by receiving an input of the one or more controlled variables or target values each indicating the state of the motor, and performing calculation that uses one or more transfer functions or state equations. The second calculation model outputs the one or more manipulated variables by receiving an input of the one or more controlled variables or target values, and performing calculation in each of the one or more node layers each including a plurality of nodes that execute calculations in parallel. The conversion process includes a process that determines, in a step of converting the first calculation model into the second calculation model, a coefficient multiplied by an input value input to the nodes, and a function designating a multiplied value as an input variable based on the one or more transfer functions or state equations for each of the plurality of nodes.

The present disclosure offers an advantage of reducing a response time to a command for controlling the motor.

DESCRIPTION OF EMBODIMENT

Exemplary Embodiment (1) Outline

Figure 1:
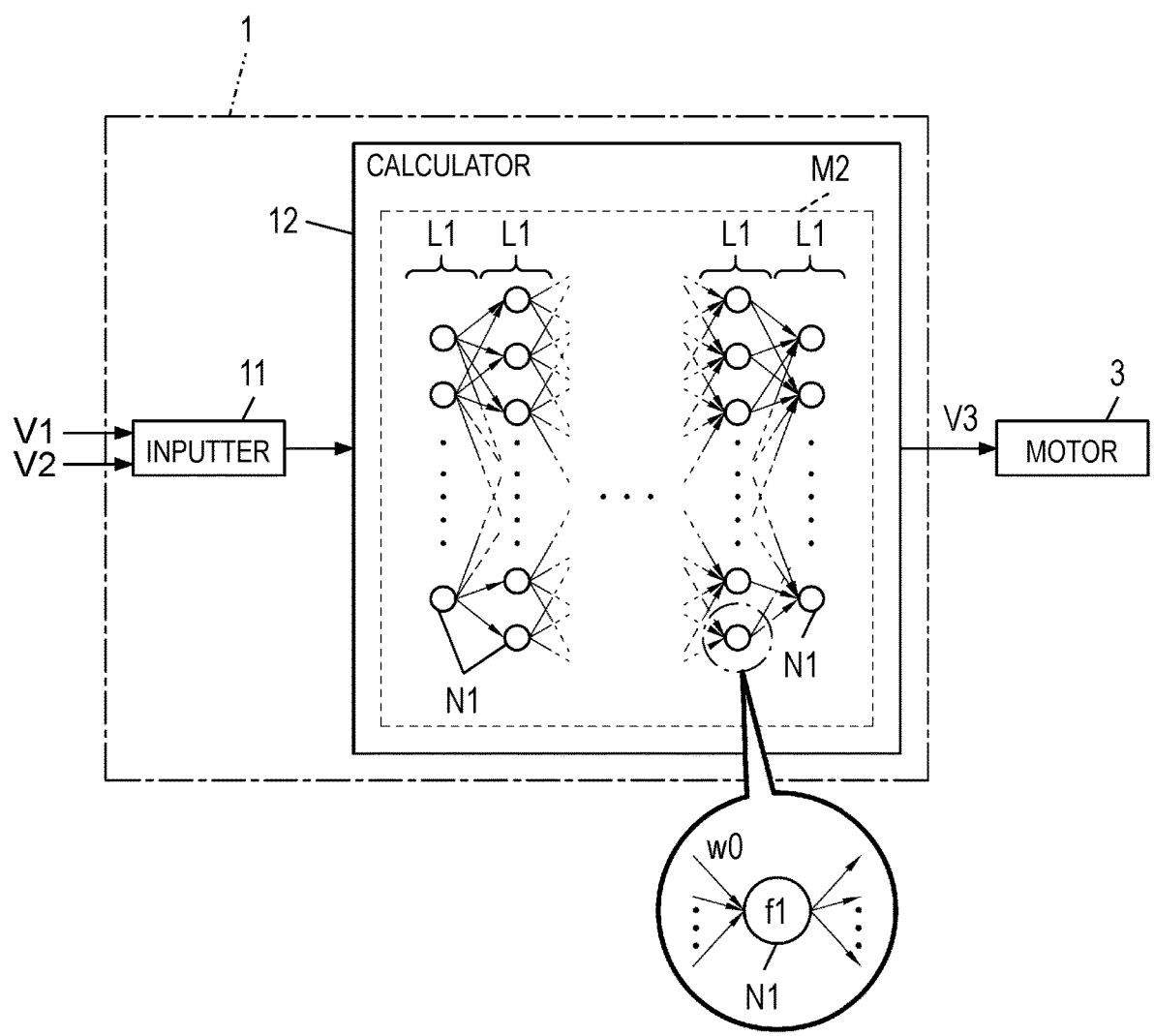
FIG. 1 is a block diagram showing an outline of a motor control system according to an exemplary embodiment of the present disclosure.

FIG. 1 is a block diagram showing an outline of a motor control system according to an exemplary embodiment of the present disclosure. For example, as shown in FIG. 1, a motor control method of the present exemplary embodiment is a method for servo-controlling motor 3 by using one or more processors each having a microcontroller or the like. More specifically, the motor control method of the present exemplary embodiment is a method for servo-controlling motor 3 by using one or more processors based on not a trained neural network but a pseudo neural network which simulates a neural network. According to the motor control method of the present exemplary embodiment, one or more controlled variables V1 or target values V2 each representing a state of motor 3 are input to one or more node layers L1. In the motor control method, calculation is performed in each of one or more node layers L1 to output one or more manipulated variables V3 used for control of motor 3. The calculation in each of one or more node layers L1 can be achieved by executing a program using one or more processors.

The "controlled variable" referred to in the present disclosure is a variable intended to be controlled in variables belonging to control targets of motor 3. For example, controlled variable V1 may include a rotation position (rotation angle) of motor 3, a rotation speed of motor 3, and the like. The "target value" referred to in the present disclosure is a variable given as a target of the controlled variable. In other words, the "target value" is a value at which controlled variable V1 of motor 3 should be targeted, and is a command value given from the outside, for example. For example, target value V2 may include a command value of the rotation position (rotation speed) of motor 3, a command value of the rotation speed of motor 3, and the like. The "manipulated variable" referred to in the present disclosure is a variable added to control targets to control controlled variable V1 of motor 3 in a control system. For example, manipulated variable V3 may include torque of motor 3, a current flowing through a coil included in motor 3, an applied voltage for controlling the current, and the like.

One or more node layers L1 each have a plurality of nodes N1 which execute calculations in parallel. Each of the plurality of nodes N1 determines an output value by executing calculation using coefficient w0 and function f1 for an input value. Coefficient w0 is specified for each node N1, and is multiplied by the input value. Function f1 is specified for each node N1, and designates a value obtained by multiplying the input value by coefficient w0 as an input variable. For example, the input variable is expressed by "ax" in any node N1 on an assumption that the input value is "x", and that coefficient w0 is "a". In addition, the output value is expressed by "y=f(ax)" on an assumption that the output value is "y".

In any node layer L1, a plurality of nodes N1 included in corresponding node layer L1 execute calculations in parallel herein. In other words, in a case where a plurality of node layers L1 are present, all nodes N1 included in not all of the plurality of node layers L1 execute calculations in parallel, but only a plurality of nodes N1 included in corresponding node layer L1 execute calculations in parallel for each of the plurality of node layers L1. When a first node layer and a second node layer are present, for example, a plurality of nodes N1 included in the first node layer execute calculations in parallel. Thereafter, the plurality of nodes N1 included in the second node layer receive a calculation result of the first node layer, for example, and execute calculations in parallel.

As described above, in the present exemplary embodiment, a plurality of nodes N1 execute calculations in parallel for one or more controlled variables V1 or target values V2 in each of one or more node layers L1 to output one or more manipulated variables V3. Therefore, in the present exemplary embodiment, a time required from input of one or more controlled variables V1 or target values V2 until output of one or more manipulated variables V3 can be reduced as compared with a case of sequential calculation for one or more controlled variables V1 or target values V2. That is, an advantage of reduction of a response time to a command for controlling motor 3 can be offered.

(2) Details

Hereinafter, motor control system 1 of the present exemplary embodiment will be described in detail. Further, control model conversion system 2 for motor 3 of the present exemplary embodiment will be hereinafter described in detail. In the following description, control model conversion system 2 for motor 3 will be simply referred to as "conversion system 2" unless otherwise specified.

(2.1) Motor Control System

As shown in FIG. 1, motor control system 1 includes inputter 11 and calculator 12. In an example, calculator 12 can be implemented by one or more processors suitable for parallel processing, such as a multi-core CPU (Central Processing Unit), a GPU (Graphics Processing Unit), and an FPGA (Field-Programmable Gate Array). Inputter 11 can be implemented by an input interface of the one or more processors described above.

One or more controlled variables V1 or target values V2 each representing a state of motor 3 are input to inputter 11 as an input value. In the present exemplary embodiment, rotation position θ2 of motor 3 (hereinafter simply referred to as "rotation position θ2") is input to inputter 11 as controlled variable V1. That is, in the present exemplary embodiment, controlled variable V1 includes at least position information (rotation position θ2) of motor 3. In an example, rotation position θ2 is detected by a resolver or a rotary encoder equipped on motor 3. Further, in the present exemplary embodiment, target value θ1 of rotation position θ2 of motor 3 (hereinafter simply referred to as "position target value θ1") is input as target value V2. In an example, position target value θ1 is given to inputter 11 from a controller for controlling motor 3.

Calculator 12 includes one or more node layers L1 (a plurality of node layers L1 in FIG. 1). One or more node layers L1 each have a plurality of nodes N1 which execute calculations in parallel. Calculator 12 performs calculations in each of one or more node layers L1 based on the input value input to inputter 11 to output one or more manipulated variables V3 used for control of motor 3. In the present exemplary embodiment, manipulated variable V3 is a target value (command value) τ of torque of motor 3. Target value τ of the torque of motor 3 is, in other words, a target value of a current flowing through an exciting coil included in motor 3. In the following description, target value τ of the torque of the motor 3 will be referred to as "torque target value τ" unless otherwise specified.

In each of node layers L1, each of the plurality of nodes N1 multiplies the input value by coefficient w0 specified for each of nodes N1, and performs calculation for a multiplied value as an input variable using function f1 specified for each of nodes N1 to determine the output value.

Hereinafter, a calculation model including one or more node layers L1 used by calculator 12 will be referred to as "second calculation model M2". More specifically, second calculation model M2 performs calculation for each of one or more controlled variables V1 or target values V2 as the input value in each of one or more node layers L1 having a plurality of nodes N1 that execute operations in parallel to output one or more manipulated variables V3. That is, calculator 12 obtains manipulated variable V3 from controlled variable V1 and target value V2 input to inputter 11 by using second calculation model M2, and outputs manipulated variable V3 to motor 3 (specifically, a driver of motor 3). Then, the driver of motor 3 controls motor 3 in accordance with manipulated variable V3. In this manner, motor 3 is controlled so that controlled variable V1 follows target value V2. In the present exemplary embodiment, motor 3 is controlled so that rotation position θ2 follows position target value θ1.

(2.2) Conversion System

Second calculation model M2 used in calculator 12 of motor control system 1 of the present exemplary embodiment can be obtained by converting first calculation model M1 in conversion system 2. First calculation model M1 is a control algorithm of existing motor 3, and is expressed by a control block using one or more transfer functions TF1, for example. That is, first calculation model M1 receives an input of one or more controlled variables V1 or target values V2 representing the state of motor 3, performs calculation using one or more transfer functions TF1 or state equations, and outputs one or more manipulated variables V3 used for control of motor 3. In the present exemplary embodiment, conversion system 2 can convert first calculation model M1 which is a control algorithm of a continuous system of existing motor 3 into second arithmetic model M2 which executes a parallel calculation process.

Figure 2:
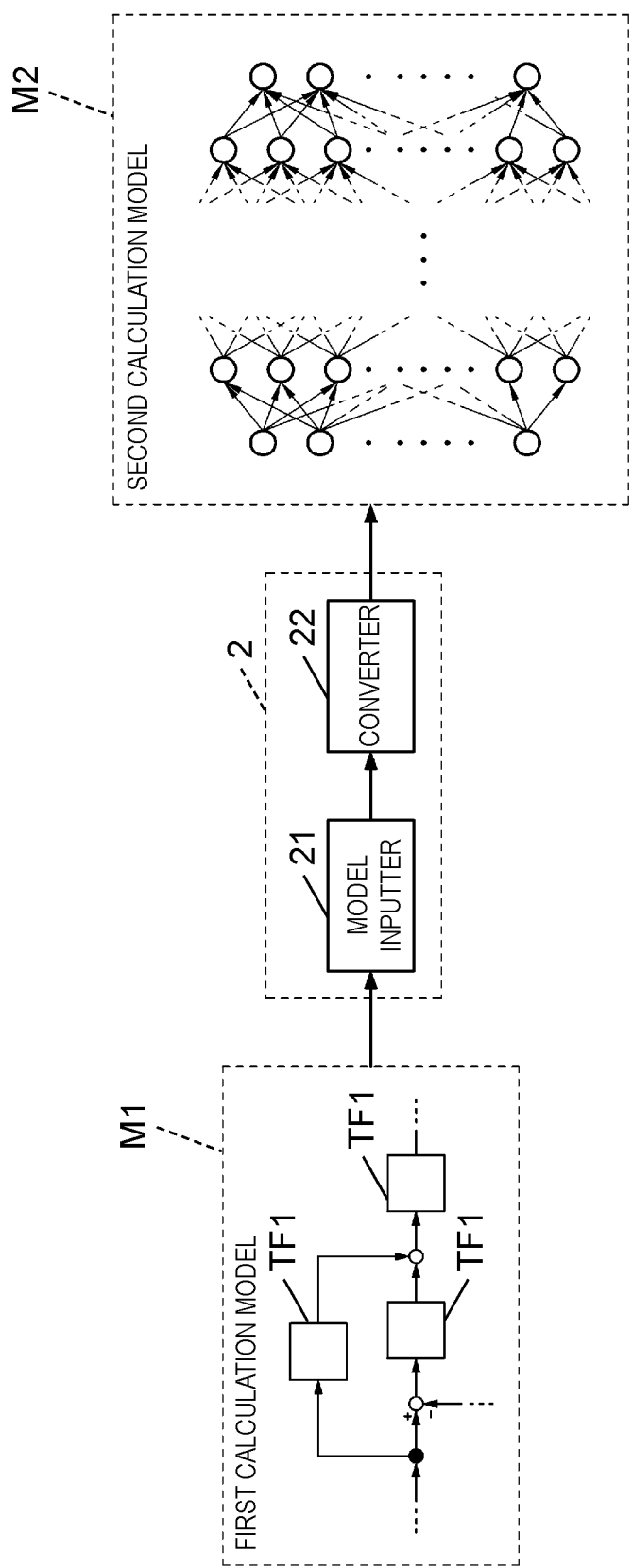
FIG. 2 is a block diagram showing an outline of a motor control model conversion system according to the exemplary embodiment of the present disclosure.

As shown in FIG. 2, conversion system 2 includes model inputter 21 and converter 22. Converter 22 can be implemented by one or more processors. In addition, model inputter 21 can be implemented by an input interface of the one or more processors described above.

First calculation model M1 is input to model inputter 21. In an example, first calculation model M1 is input to model inputter 21 as a source code that can be handled by formula manipulation software executed by one or more processors included in converter 22.

Converter 22 converts first calculation model M1 input to model inputter 21 into second calculation model M2, and outputs second calculation model M2. According to the present exemplary embodiment, converter 22 converts first calculation model M1 into first conversion model M11 (see FIG. 7) and second conversion model M12 (see FIG. 8) in this order as will be described in detail in "(3.2) Operation of conversion system", and then converts second conversion model M12 into second calculation model M2.

In a step of converting first calculation model M1 into second calculation model M2, converter 22 determines coefficient w0 multiplied by the input value input to node N1 and function f1 designating a multiplied value as an input variable based on one or more transfer functions TF1 or state equations for each of the plurality of nodes N1.

In other words, in the step of converting first calculation model M1 into second calculation model M2, the control model conversion method for motor 3 determines coefficient w0 multiplied by the input value input to node N1 and function f1 designating the multiplied value as an input variable based on one or more transfer functions TF1 or state equations for each of the plurality of nodes N1. In the following description, the control model conversion method for motor 3 will be simply referred to as a "conversion method" unless otherwise specified.

(2.3) First Calculation Model

Figure 3:
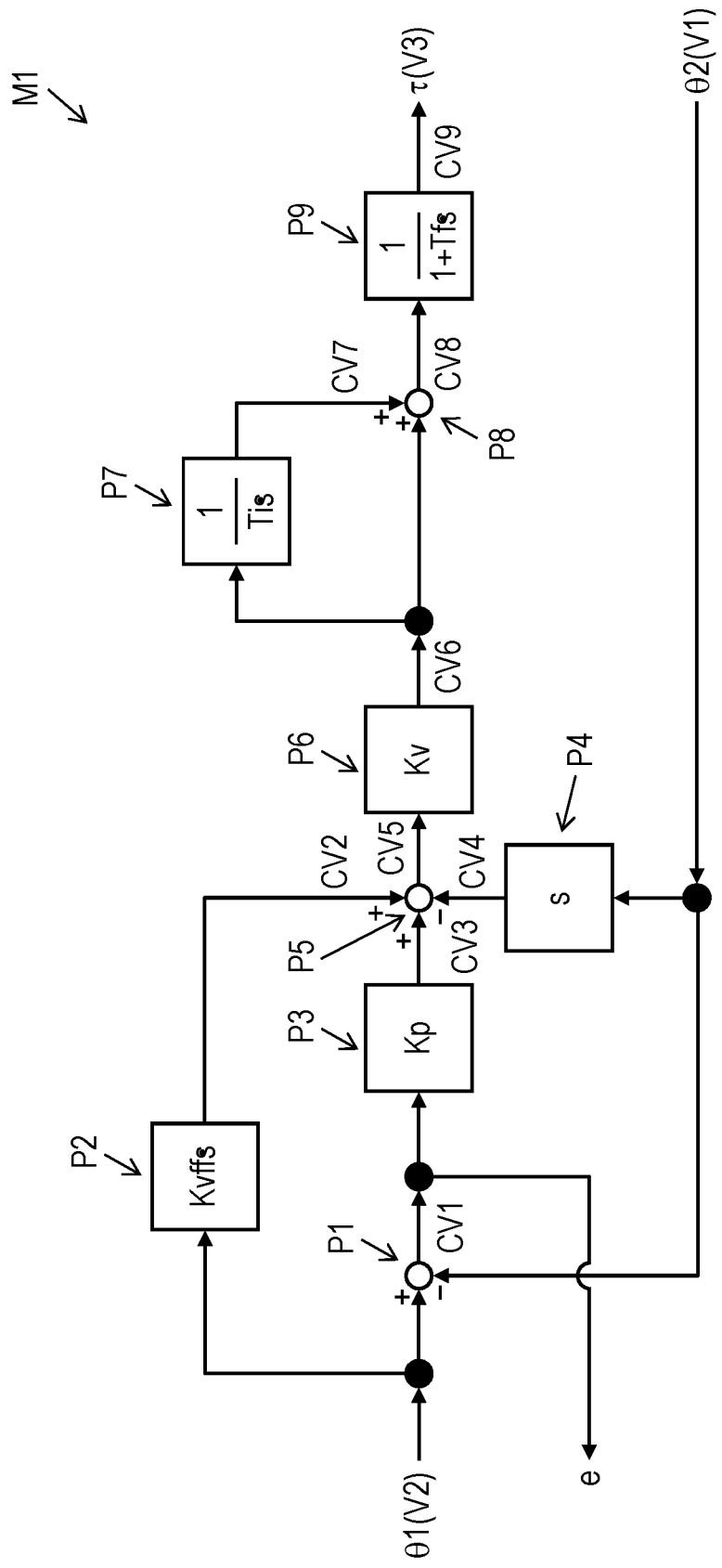
FIG. 3 is a block diagram showing an example of a first calculation model which is a conversion target in the motor control model conversion system according to the exemplary embodiment of the present disclosure.

Hereinafter, a specific example of first calculation model M1 will be described with reference to FIG. 3. FIG. 3 is a block diagram showing an example of first calculation model M1 as a conversion target in motor control model conversion system 2 according to the exemplary embodiment of the present disclosure. First calculation model M1 shown in FIG. 3 is a continuous system control block having a cascade configuration which includes P control of rotation position θ2 of motor 3 and PI control of rotation speed of motor 3. Position target value θ1 as target value V2, and rotation position θ2 as controlled variable V1 are input to first calculation model M1. First calculation model M1 outputs torque target value τ as manipulated variable V3, and deviation e as a difference between position target value θ1 and rotation position θ2. Deviation e is used to evaluate followability of the rotation position of motor 3 by first calculation model M1.

Specifically, first calculation model M1 includes first process P1 to ninth process P9. First process P1 is a process for obtaining first calculated value CV1 (i.e., deviation e) by subtracting rotation position θ2 from position target value θ1. Second process P2 is a process for obtaining second calculated value CV2 by multiplying a result of differentiation of position target value θ1 by velocity feedforward gain Kvff. In FIG. 3, "s" represents a derivative element in Laplace transform. Third process P3 is a process for obtaining third calculated value CV3 by multiplying first calculated value CV1 (deviation e) by position loop gain Kp. Fourth process P4 is a process of obtaining fourth calculated value CV4 corresponding to the rotation speed of motor 3 by differentiating rotation position θ2.

Fifth process P5 is a process for obtaining calculated value CV5 by subtracting fourth calculated value CV4 corresponding to the rotation speed of motor 3 from the sum of second calculated value CV2 and third calculated value CV3 corresponding to the target value of the rotation speed of motor 3. Sixth process P6 is a process for obtaining sixth calculated value CV6 by multiplying fifth calculated value CV5 by velocity loop gain Kv. Seventh process P7 is a process for obtaining seventh calculated value CV7 by integrating a value obtained by dividing sixth calculated value CV6 by velocity loop integration time constant Ti. In FIG. 3, "1/s" represents an integral element in Laplace transform. Eighth process P8 is a process for obtaining eighth calculated value CV8 by adding seventh calculated value CV7 to sixth calculated value CV6. Ninth process P9 is a process for obtaining ninth calculated value CV9 corresponding to torque target value τ by smoothing eighth calculated value CV8 through a first-order lag filter having torque filter time constant Tf. In FIG. 3, "1/(1+Tf·s)" represents a first-order lag element in Laplace transform.

According to first calculation model M1, for execution of third process P3, first calculated value CV1 (deviation e) is obtained in advance by executing first process P1. For execution of fifth process P5, second calculated value CV2 to fourth calculated value CV4 are obtained in advance by executing second process P2 to fourth process P4. Note that the order of execution of second process P2, third process P3, and fourth process P4 is not limited to this order. For execution of eighth process P8, sixth calculated value CV6 and seventh calculated value CV7 are obtained in advance by executing sixth process P6 and seventh process P7. Note that the order of execution of sixth process P6 and seventh process P7 may be reversed. For execution of ninth process P9, eighth calculated value CV8 is obtained in advance by executing eighth process P8. In this manner, according to first calculation model M1, first process P1 to ninth process P9 are executed as sequential processing.

(2.4) Second Calculation Model

Figure 4:
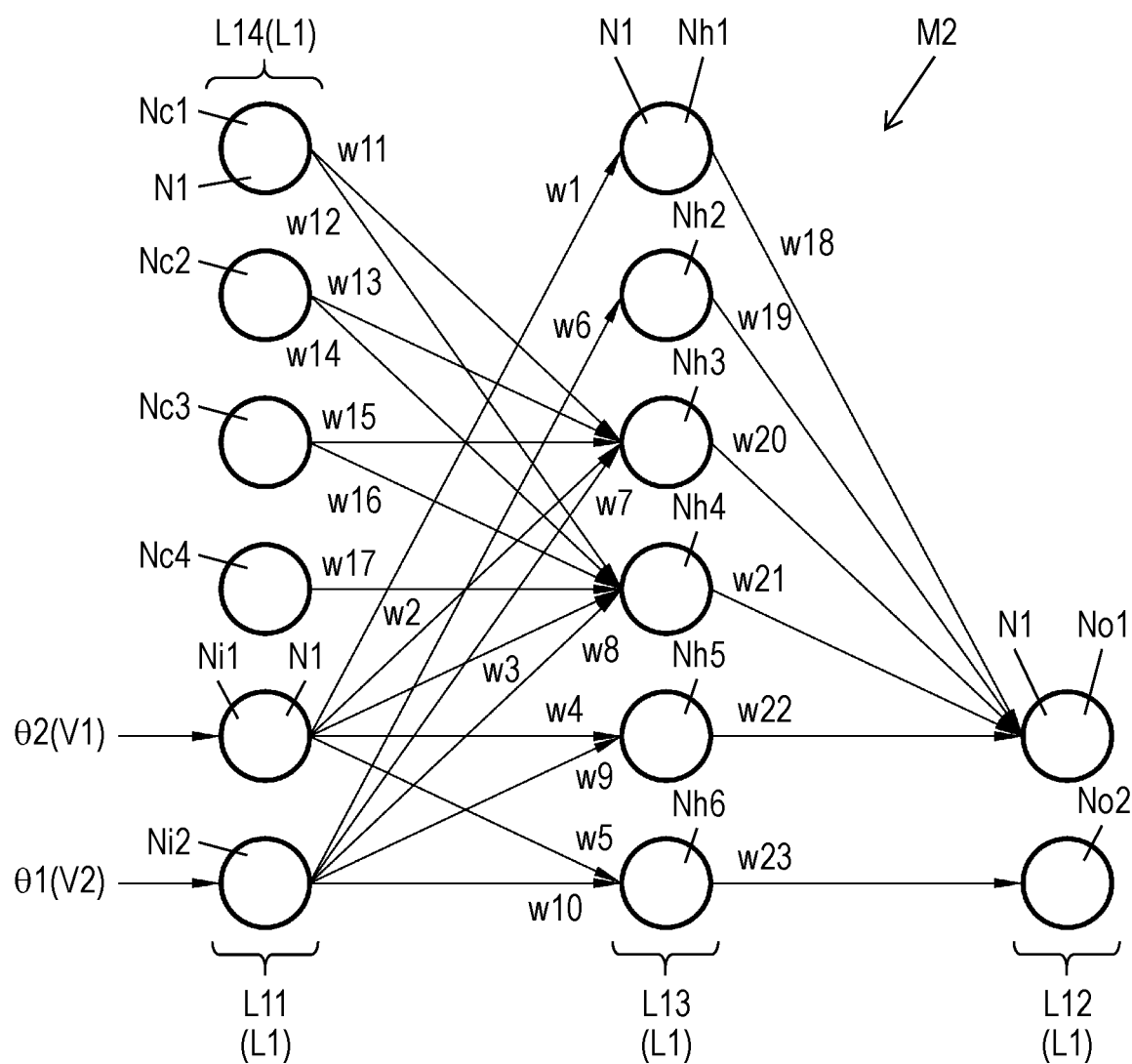
FIG. 4 is a schematic diagram showing an example of a second calculation model produced by converting the first calculation model in the motor control model conversion system according to the exemplary embodiment of the present disclosure.

Hereinafter, a specific example of second calculation model M2 will be described with reference to FIG. 4. FIG. 4 is a schematic diagram showing an example of second calculation model M2 produced by converting first calculation model M1 in motor control model conversion system 2 according to the exemplary embodiment of the present disclosure. Second calculation model M2 shown in FIG. 4 has a plurality of (four in this example) node layers L1. The plurality of node layers L1 include input layer L11 having two input nodes Ni1 and Ni2, and output layer L12 having two output nodes No1 and No2. The plurality of node layers L1 include hidden layer L13 having six hidden nodes Nh1 to Nh6, and context layer L14 having four context nodes Nc1 to Nc4.

Rotation position θ2 as controlled variable V1, and position target value θ1 as the target value are input to input nodes Ni1 and Ni2, respectively. Input nodes Ni1 and Ni2 output the input values (position target value θ1 and rotation position θ2) without change. Each of output nodes No1 and No2 outputs a calculation result of the node as a manipulated variable (torque target value τ and deviation e).

Hidden nodes Nh1 to Nh4 are nodes corresponding to input nodes Ni1 and Ni2 and context nodes Nc1 to Nc4. Each of hidden nodes Nh1 to Nh4 multiplies the input value by "$z^{-1}$", and outputs a multiplied value as will be described below in "(3.2) Operation of conversion system". Hidden nodes Nh5 and Nh6 are nodes corresponding to input nodes Ni1 and Ni2. Each of hidden nodes Nh5 and Nh6 calculates a sum of a value obtained by multiplying position target value θ1, which is the output value of input node Ni1, by a coefficient, and a value obtained by multiplying rotation position θ2, which is the output value of input node Ni2, by a coefficient, and outputs the sum without change.

Context nodes Nc1 to Nc4 hold output values of hidden nodes Nh1 to Nh4 until subsequent outputs from hidden nodes Nh1 to Nh4, and output the held values. That is, context nodes Nc1 to Nc4 output previous output values of hidden nodes Nh1 to Nh4 (one sampling time before in this example). That is, in the present exemplary embodiment, nodes N1 (context node Nc1 to Nc4) included in at least one node layer L1 (context layer L14) in one or more node layers L1 use previous output values of other nodes (hidden node Nh1 to Nh4).

Coefficients w1 to w23 between the respective nodes of input nodes Ni1 and Ni2, hidden nodes Nh1 to Nh6, output nodes No1 and No2, and context nodes Nc1 to Nc4 will be described in detail in "(3.2) Operation of conversion system" described below. Note that each of coefficients w1 to w23 in the following description will be simply referred to as "coefficient w0" when no distinction is made therebetween.

(3) Operation (3.1) Operation of Motor Control System

Figure 5:
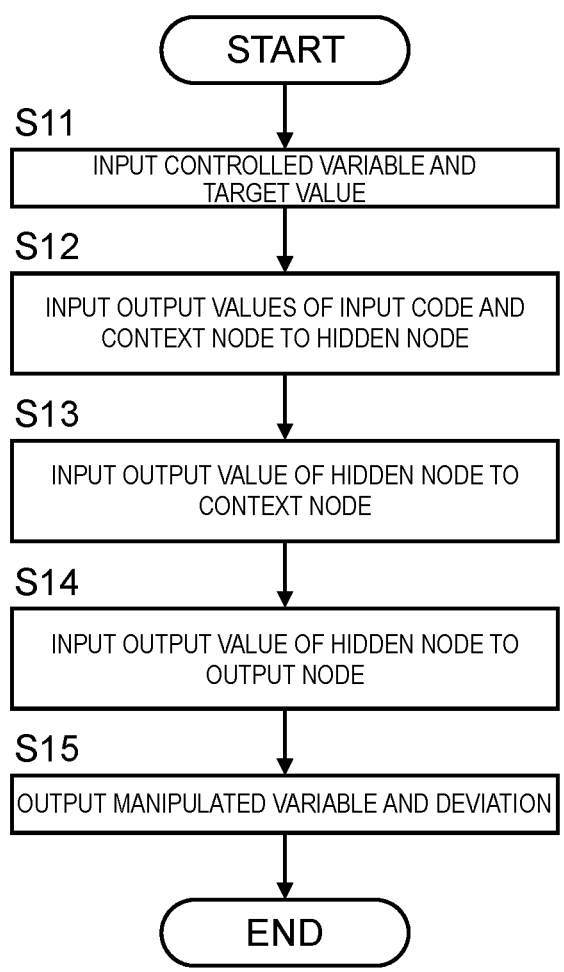
FIG. 5 is a flowchart showing an operation of the motor control system according to the exemplary embodiment of the present disclosure.
Figure 7:
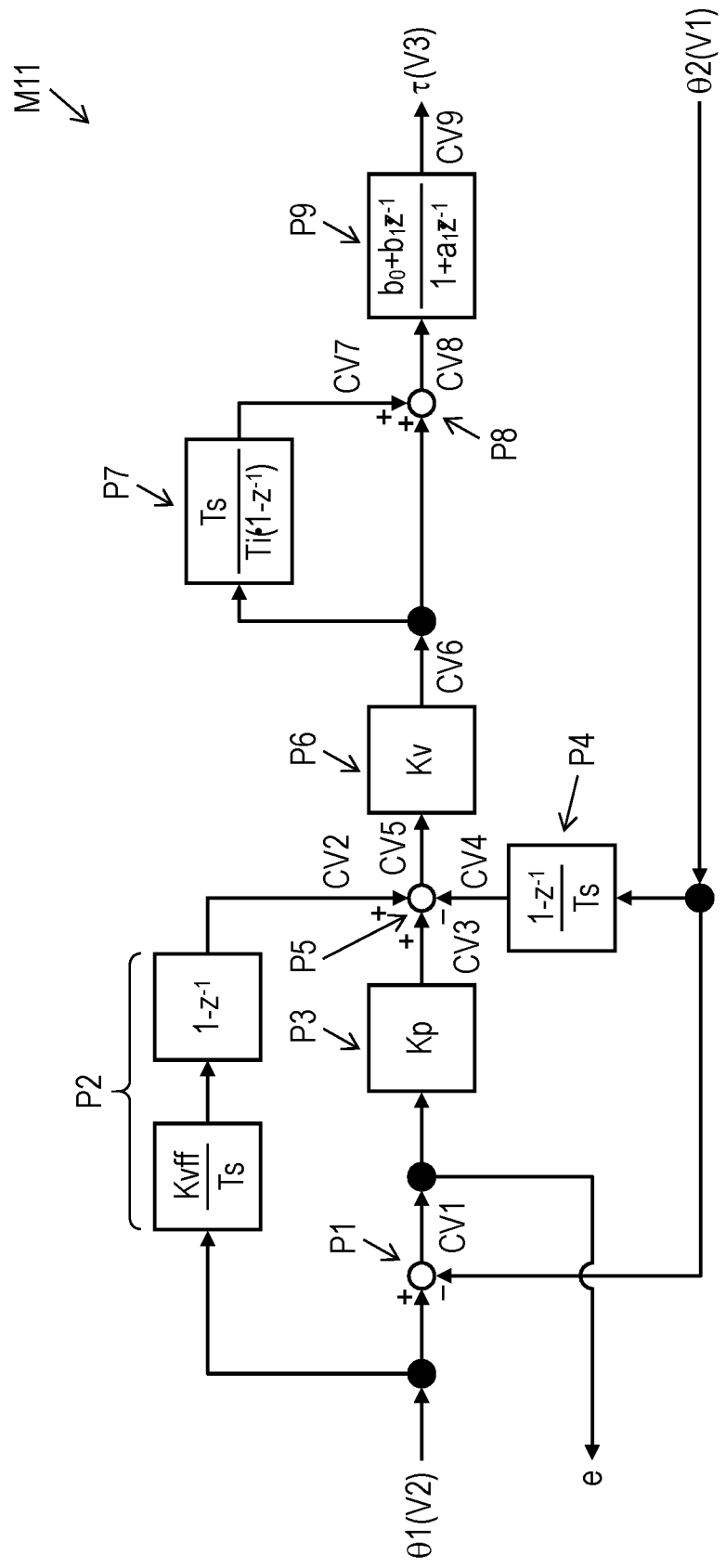
FIG. 7 is a block diagram showing an example of a first conversion model produced by converting the first calculation model of the motor control model conversion system according to the exemplary embodiment of the present disclosure.

Hereinafter, an operation of motor control system 1, in other words, a motor control method will be described mainly with reference to FIGS. 5 and 7. FIG. 5 is a flowchart showing the operation of the motor control system according to the exemplary embodiment of the present disclosure. FIG. 7 is a block diagram showing an example of a first conversion model produced by converting first calculation model M1 of motor control model conversion system 2 according to the exemplary embodiment of the present disclosure. First, controlled variable V1 (rotation position θ2 in this example) and target value V2 (position target value θ1 in this example) are input to the inputter 11 to input controlled variable V1 and target value V2 to nodes Ni1 and Ni2 of second calculation model M2, respectively (step S11). Values obtained by multiplying output values of input nodes Ni1 and Ni2 by coefficients w0 are input to hidden nodes Nh1 to Nh6 (step S12). Further, values obtained by multiplying output values of context nodes Nc1 to Nc4 by coefficients w0 are input to hidden nodes Nh1 to Nh4, respectively (step S12).

Output values of hidden nodes Nh1 to Nh4 are input to context nodes Nc1 to Nc4 (step S13). As a result, context nodes Nc1 to Nc4 hold previous output values of hidden nodes Nh1 to Nh4. In addition, values obtained by multiplying output values of hidden nodes Nh1 to Nh6 by coefficients w0 are input to output nodes No1 and No2 (step S14).

Subsequently, output nodes No1 and No2 output input values without change. Accordingly, second calculation model M2 outputs manipulated variable V3 (torque target value τ in this example) and deviation e (step S15). The driver of motor 3 controls motor 3 in accordance with manipulated variable V3. In this manner, motor 3 is controlled so that controlled variable V1 follows target value V2.

As described above, according to motor control system 1 and the motor control method in the present exemplary embodiment, a plurality of nodes N1 execute calculations in parallel for one or more controlled variables V1 or target values V2 in each of one or more node layers Li to output one or more manipulated variables V3. Therefore, in the present exemplary embodiment, a time required from input of one or more controlled variables V1 or target values V2 until output of one or more manipulated variables V3 can be reduced as compared with a case of sequential calculation for one or more controlled variables V1 or target values V2. That is, an advantage of reduction of a response time to a command for controlling motor 3 can be offered.

(3.2) Operation of Conversion System

Figure 6:
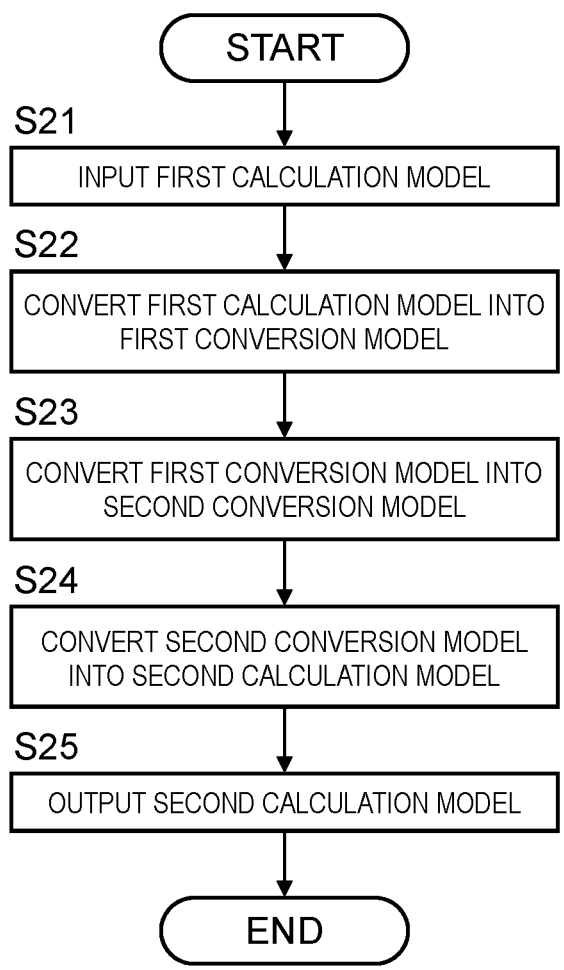
FIG. 6 is a flowchart showing an operation of the motor control model conversion system according to the exemplary embodiment of the present disclosure.
Figure 8:
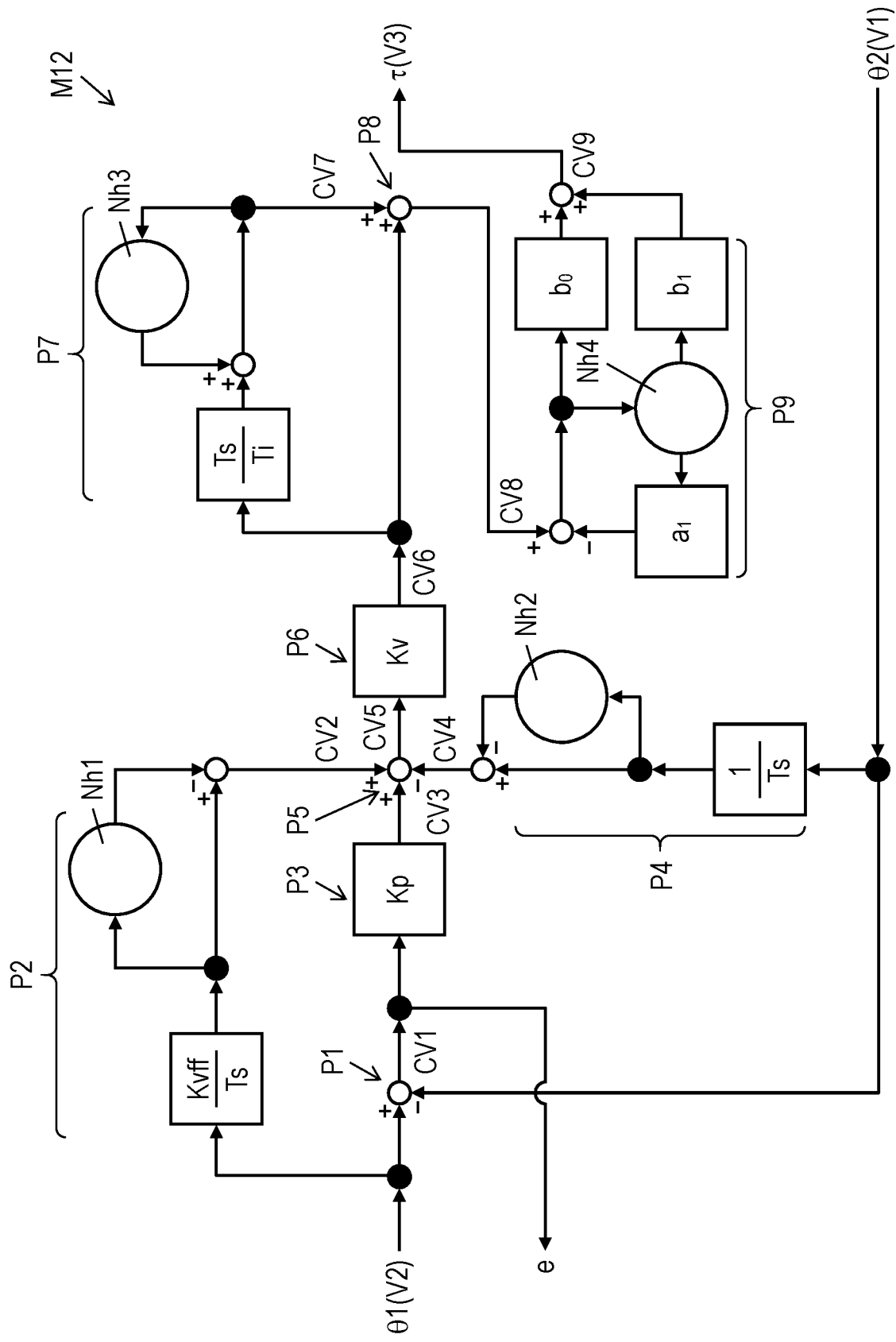
FIG. 8 is a block diagram showing an example of a second conversion model produced by converting the first conversion model of the motor control model conversion system according to the exemplary embodiment of the present disclosure.

Hereinafter, an operation of conversion system 2, i.e., a conversion method will be described mainly with reference to FIGS. 3, 4, 6 to 8. FIG. 6 is a flowchart showing an operation of motor control model conversion system 2 according to the exemplary embodiment of the present disclosure. FIG. 8 is a block diagram showing an example of a second conversion model produced by converting the first conversion model of motor control model conversion system 2 according to the exemplary embodiment of the present disclosure. First, in response to input of first calculation model M1 to model inputter 21 (step S21), converter 22 executes a process for converting first calculation model M1 into first conversion model M11 (step S22). That is, converter 22 converts first calculation model M1 as a continuous system control algorithm into first conversion model M11 as a discrete system control algorithm. Specifically, converter 22 converts transfer function TF1 expressed by Laplace transform in first process P1 to ninth process P9 of first calculation model M1, such as a differential element, an integral element, and first-order lag element, into transfer function TF1 expressed by z transform. In this manner, converter 22 converts first calculation model M1 into first conversion model M11.

According to the present exemplary embodiment, the differential element in second process P2 and fourth process P4 of first calculation model M1 is expressed by following equation (1) by z transform using first-order approximation. The integral element in seventh process P7 of first calculation model M1 is expressed by following equation (2) by z transform using first-order approximation. The first-order lag element in ninth process P9 of first calculation model M1 is expressed by following equation (3) by bilinear transform. In equations (1) to (3), "Ts" represents a sampling period, and "$z^{-1}$" represents a delay element indicating a delay of one sampling time.

[Math. 1]

$$s = \frac{1 - z^{-1}}{Ts} \quad (1)$$

$$\frac{1}{s} = \frac{Ts}{1 - z^{-1}} \quad (2)$$

$$s = \frac{2}{Ts} \cdot \frac{1 - z^{-1}}{1 + z^{-1}} \quad (3)$$

By the above conversion, first calculation model M1 is converted into first conversion model M11 shown in FIG. 7. Specifically, second process P2, fourth process P4, seventh process P7, and ninth process P9 in first conversion model M11 are expressed by following equations (4) to (7), respectively. In the equations shown below, "θ1" and "θ2" represent position target value θ1 and rotation position θ2, respectively. Further, in the equations shown below, "v2", "v4", and "v6" to "v9" represent second calculated value CV2, fourth calculated value CV4, and sixth calculated value CV6 to ninth calculated value CV9, respectively. Further, in the equations shown below, "a1", "b0", and "b1" are constants obtained by simplifying constants expressed by sampling period Ts and torque filter time constant Tf.

[Math. 2]

$$v2 = \frac{Kvff}{Ts} \cdot (1 - z^{-1}) \cdot \theta1 \quad (4)$$

$$v4 = \frac{1}{Ts} \cdot (1 - z^{-1}) \cdot \theta2 \quad (5)$$

$$v7 = \frac{Ts}{Ti \cdot (1 - z^{-1})} \cdot v6 \quad (6)$$

$$v9 = \frac{b0 + b1 \cdot z^{-1}}{1 + a1 \cdot z^{-1}} \cdot v8 \quad (7)$$

Converter 22 subsequently executes a process for converting first conversion model M11 into second conversion model M12 shown in FIG. 8 (step S23). Specifically, converter 22 executes a process for replacing delay elements "$z^{-1}$" in second process P2, fourth process P4, seventh process P7, and ninth process P9 with hidden nodes Nh1 to Nh4 in hidden layer L13.

Converter 22 executes a process for converting second conversion model M12 into second calculation model M2 shown in FIG. 4 (step S24). Specifically, conversion system 2 converts position target value θ1 and rotation position θ2, which are two input values input to first calculation model M 1, into two input nodes Ni1 and Ni2 of the input layer, respectively. Further, conversion system 2 converts torque target value τ and deviation e, which are the two output values from first calculation model M1, into two output nodes No1 and No2 of the output layer, respectively.

Converter 22 obtains coefficients w0 between respective nodes N1 as input nodes Ni1 and Ni2, hidden nodes Nh1 to Nh6, output nodes No1 and No2, and context nodes Nc1 to Nc4 based on second conversion model M12. Coefficients w0 can be calculated by multiplying and adding weights of directed sides while following directions of arrows shown in the figure between two nodes N1 in second conversion model M12.

Coefficients w0 between respective nodes N1 in second calculation model M2 are listed in equations (8) to (30). In the equations shown below, "h1" to "h6" represent output values of hidden nodes Nh1 to Nh6, respectively. In the equations shown below, "c1" to "c4" represent output values of context nodes Nc1 to Nc4, respectively. In the equations shown below, "τ" and "e" represent torque target value τ and deviation e, respectively.

Coefficients w1 to w5 are coefficients between input node Ni1 and hidden nodes Nh1, Nh3, Nh4, Nh5, Nh6, respectively. Coefficients w1 to w5 are expressed by equations (8) to (12), respectively.

[Math. 3]

$$w1 = \frac{Kvff}{Ts} \tag{8}$$

$$w2 = \frac{Ts}{Ti} \cdot Kv \cdot \left(Kp + \frac{Kvff}{Ts}\right) \tag{9}$$

$$w3 = \left(1 + \frac{Ts}{Ti}\right) \cdot Kv \cdot \left(Kp + \frac{Kvff}{Ts}\right) \tag{10}$$

$$w4 = b0 \cdot \left(1 + \frac{Ts}{Ti}\right) \cdot Kv \cdot \left(Kp + \frac{Kvff}{Ts}\right) \tag{11}$$

$$w5 = 1 \tag{12}$$

Coefficients w6 to w10 are coefficients between input node Ni2 and hidden nodes Nh2, Nh3, Nh4, Nh5, Nh6, respectively. Coefficients w6 to w10 are expressed by equations (13) to (17), respectively.

[Math. 4]

$$w6 = \frac{1}{Ts} \tag{13}$$

$$w7 = -\frac{Ts}{Ti} \cdot Kv \cdot \left(Kp + \frac{1}{Ts}\right) \tag{14}$$

$$w8 = -\left(1 + \frac{Ts}{Ti}\right) \cdot Kv \cdot \left(Kp + \frac{1}{Ts}\right) \tag{15}$$

$$w9 = -b0 \cdot \left(1 + \frac{Ts}{Ti}\right) \cdot Kv \cdot \left(Kp + \frac{1}{Ts}\right) \tag{16}$$

$$w10 = -1 \tag{17}$$

Coefficients w11 and w12 are coefficients between context node Nc1 and hidden nodes Nh3 and Nh4, respectively. Coefficients w11 and w12 are expressed by equations (18) and (19), respectively.

[Math. 5]

$$w11 = -\frac{Ts}{Ti} \cdot Kv \tag{18}$$

$$w12 = -\left(1 + \frac{Ts}{Ti}\right) \cdot Kv \tag{19}$$

Coefficients w13 and w14 are coefficients between context node Nc2 and hidden nodes Nh3 and Nh4, respectively. Coefficients w13 and w14 are expressed by equations (20) and (21), respectively.

[Math. 6]

$$w13 = \frac{Ts}{Ti} \cdot Kv \tag{20}$$

$$w14 = \left(1 + \frac{Ts}{Ti}\right) \cdot Kv \tag{21}$$

Coefficients w15 and w16 are coefficients between context node Nc3 and hidden nodes Nh3 and Nh4, respectively. Coefficients w15 and w16 are expressed by equations (22) and (23).

[Math. 7]

$$w15 = 1 \tag{22}$$

$$w16 = 1 \tag{23}$$

Coefficient w17 is a coefficient between context node Nc4 and hidden node Nh4. Coefficient w17 is expressed by Equation (24).

[Math. 8]

$$w17 = -a1 \tag{24}$$

Coefficients w18 to w22 are coefficients between hidden nodes Nh1 to Nh4 and output node No1, respectively. Coefficients w18 to w22 are expressed by equations (25) to (29), respectively.

[Math. 9]

$$w18 = -b0 \cdot \left(1 + \frac{Ts}{Ti}\right) \cdot Kv \tag{25}$$

$$w19 = b0 \cdot \left(1 + \frac{Ts}{Ti}\right) \cdot Kv \tag{26}$$

$$w20 = b0 \tag{27}$$

$$w21 = b1 \tag{28}$$

$$w22 = 1 \tag{29}$$

In addition, coefficient w23 is a coefficient between hidden node Nh6 and output node No2. Coefficient w23 is expressed by equation (30).

[Math. 10]

$$w23 = 1 \tag{30}$$

As apparent from above, converter 22 executes a following process in the step of converting first calculation model M1 into second calculation model M2. Specifically, converter 22 determines the number of a plurality of nodes N1, and respective coefficients w0 for the plurality of nodes N1 based on the number of previous states of one or more transfer functions TF1 or state equations in first calculation model M1, and a connection relationship between input and output. The number of the previous states of transfer functions TF1 in the present disclosure corresponds to the number of delay elements "$z^{-1}$". The number of the previous states of the state equations in the present disclosure corresponds to the number of elements of state variables. In other words, the control model conversion method for motor 3 includes a following method in the step of converting first calculation model M1 into second calculation model M2. Specifically, this method determines the number of the plurality of nodes N1, and respective coefficients w0 for the plurality of nodes N1 based on the number of the previous states of one or more transfer functions TF1 or state equations in first calculation model M1, and on the connection relationship between input and output, and the number of multiple nodes N1.

Converter 22 outputs second calculation model M2 obtained by converting first calculation model M1 in the manner described above (step S25).

In the description of the operation of conversion system 2 so far, a known position control system generally used in the motor control system is adopted as first calculation model M1. However, a more generally employed combination of the transfer functions or the state equations is adoptable as first calculation model M1.

Figure 9:
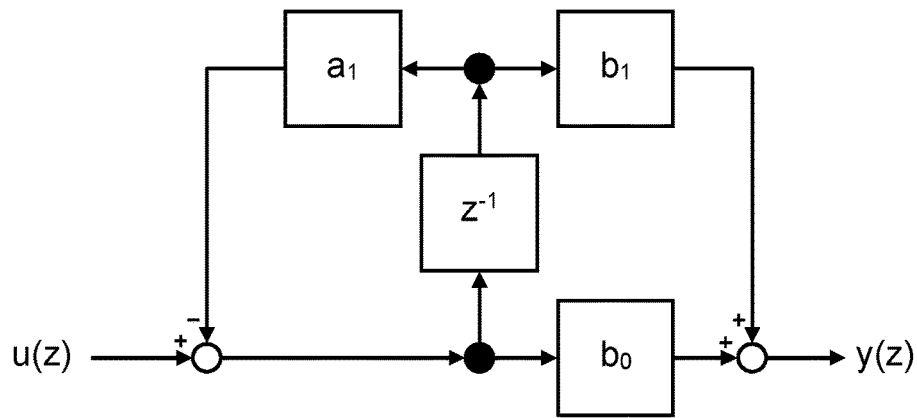
FIG. 9 is a block diagram showing an example of the first calculation model expressed by one or more transfer functions.
Figure 10:
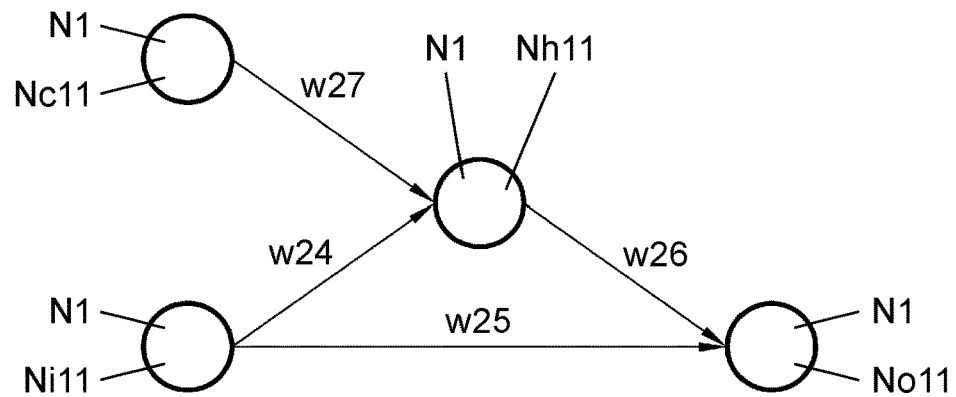
FIG. 10 is a schematic diagram showing an example of a second calculation model produced by converting the first calculation model of the motor control model conversion system according to the exemplary embodiment of the present disclosure.

Described hereinafter with reference to FIGS. 9 and 10 as an example of generalization of converter 22 will be an example of a method of converting first calculation model M1 expressed by one or more transfer functions TF1 into second calculation model M2. FIG. 9 is a block diagram showing an example of first calculation model M1 expressed by one or more transfer functions. FIG. 10 is a schematic diagram showing an example of a second calculation model produced by converting first calculation model M1 of motor control model conversion system 2 according to the exemplary embodiment of the present disclosure.

Assuming that first calculation model M1 is a discrete transfer function, a relationship between input, output, and transfer function TF1 is expressed by equation (31) on an assumption that input, output, and transfer function TF1 are "u(z)", "y(z)", and "G(z)", respectively.

In a simple example, transfer function TF1 is expressed by equation (32) when transfer function TF1 is a first-order transfer function having a first-order numerator and a first-order denominator. In the following equation shown below, "a1", "b0", and "b1" are constants, and "$z^{-1}$" is a delay element representing a delay of one sampling time.

[Math. 11]

$$y(z) = G(z) \cdot u(z). \quad (31)$$

$$G(z) = \frac{b0 + b1 \cdot z^{-1}}{1 + a1 \cdot z^{-1}}. \quad (32)$$

A relationship between output "y(z)" and input "u(z)" is expressed by equation (33) based on equations (31) and (32).

[Math. 12]

$$y(z) = (b0 + b1 \cdot z^{-1}) \cdot u(z) - z1 \cdot z^{-1} \cdot y(z) \quad (33)$$

First calculation model M1 can be expressed by a block diagram shown in FIG. 9 based on equation (33). As shown in FIG. 10, input "u(z)", output "y(z)", and delay element "$z^{-1}$" in first calculation model M1 can be replaced with input node Ni11, output node No11, and hidden node Nh11 in second calculation model M2, respectively. In FIG. 10, context node Nc11 is a node that holds an output value of previous hidden node Nh11.

Coefficients w24 to w27 between respective nodes N1 are obtained based on first calculation model M1 shown in FIG. 9. Each of coefficients w24 to w27 can be calculated by multiplying and adding weights of directed sides while following directions of arrows shown in the figure between two nodes N1 in first calculation model M1. In this example, coefficients w24, w25, w26, w27 are "1", "b0", "b1", "−a1", respectively. In this manner, first calculation model M1 expressed by one or more transfer functions TF1 can be converted into second calculation model M2.

When transfer function TF1 is a second-order transfer function which has a second-order numerator and a second-order denominator, conversion for replacing delay element "$z^{-1}$" with a hidden node can be defined similarly to the manner described above. In this case, second-order term "$(z^{-1})^2$" having coefficient "b2" is added to the numerator, and second-order term "$(z^{-1})^2$" having coefficient "a2" is added to the denominator in equation (32). Note herein that "$(z^{-1})^2$" represents a delay element indicating a delay of two sampling times. When transfer function TF1 is a higher-order transfer function such as a third or higher-order function, conversion for converting delay element "$z^{-1}$" with a hidden node can be defined by adding a multi-order term to equation (32) in a manner similar to the manner described above.

Figure 11:
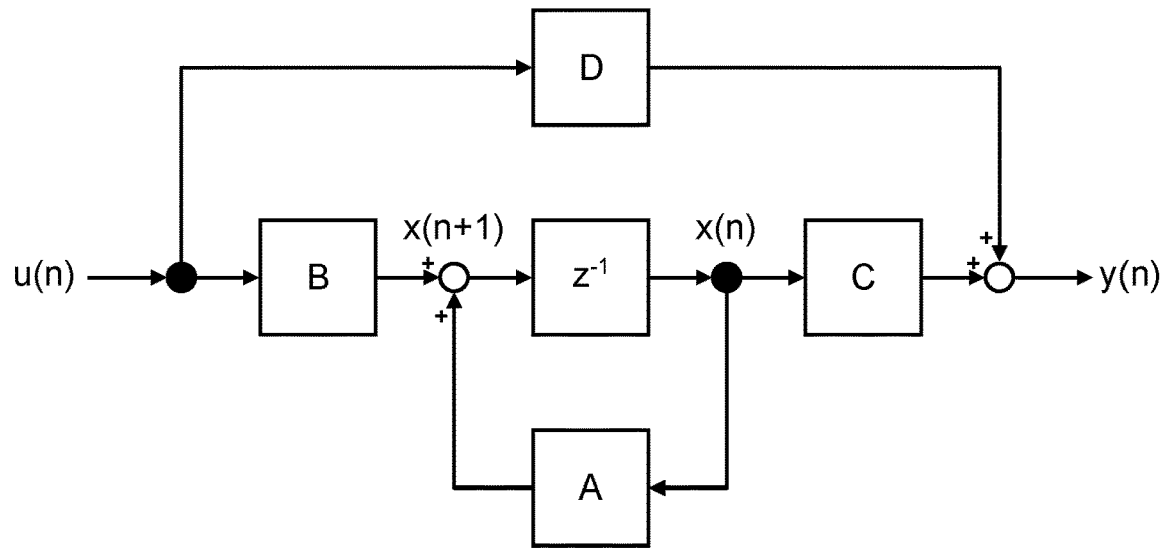
FIG. 11 is a block diagram showing an example of the first calculation model expressed by one or more state equations.
Figure 12:
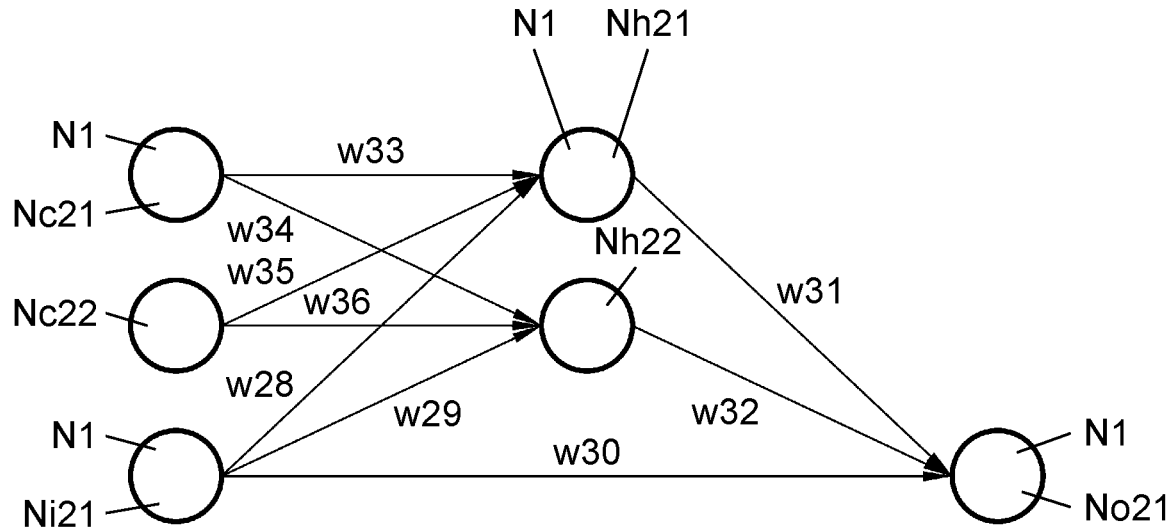
FIG. 12 is a schematic diagram showing an example of the second calculation model produced by converting the first calculation model in the motor control model conversion system according to the exemplary embodiment of the present disclosure.

Described hereinafter as another example of generalization of converter 22 with reference to FIGS. 11 and 12 will be a method of converting first calculation model M1 expressed by one or more state equations into second calculation model M2. FIG. 11 is a block diagram showing an example of the first calculation model expressed by one or more state equations. FIG. 12 is a schematic diagram showing an example of the second calculation model produced by converting the first calculation model in motor control model conversion system 2 according to the exemplary embodiment of the present disclosure. Assuming that first calculation model M1 is a discrete state equation, a relationship between input, output, and a state variable is expressed by equations (34) and (35) on an assumption that the input, the output, and the state variable are "u(n)", "y(n)", and "x(n)", respectively.

In a simple example, in a case where the equation of state has one input and one output and two state variables, "A" is a 2×2 matrix (see equation (36)), and "B" is a 2×1 matrix (see equation (37)) in equation (34). In equation (35), "C" is a 1×2 matrix (see equation (38)), and "D" is a 1×1 matrix (see equation (39)). State variable "x(n)" is expressed by a 2×1 matrix (see equation (40)). That is, in the present example, state variable "x(n)" contains two elements.

[Math. 13]

$$x(n+1) = A \cdot x(n) + B \cdot u(n) \quad (34)$$

$$y(n) = C \cdot x(n) + D \cdot u(n) \quad (35)$$

$$A = \begin{bmatrix} a11 & a12 \\ a21 & a22 \end{bmatrix} \quad (36)$$

$$B = \begin{bmatrix} b1 \\ b2 \end{bmatrix} \quad (37)$$

$$C = [c1 \ c2] \quad (38)$$

$$D = [d] \quad (39)$$

$$x(n) = \begin{bmatrix} x1 \\ x2 \end{bmatrix} \quad (40)$$

First calculation model M1 can be expressed by a block diagram shown in FIG. 11 based on equations (34) and (35). As shown in FIG. 12, the elements of input "u(n)", output "y(n)", and state variable "x(n)" in first calculation model M1 can be replaced with input node Ni21, output node No21, and hidden nodes Nh21 and Nh22 in second calculation model M2, respectively. In FIG. 12, context nodes Nc21 and Nc22 are nodes that hold output values of previous hidden nodes Nh21 and Nh22.

Coefficients w28 to w36 between respective nodes N1 are obtained based on first calculation model M1 shown in FIG. 11. Each of coefficients w28 to w36 can be calculated by multiplying and adding weights of directed sides while following directions of arrows shown in the figure between two nodes N1 in first calculation model M1. In the present example, coefficients w28, w29, w30, w31, w32 are "b1", "b2", "d", "c1", and "c2", respectively. In addition, coefficients w33, w34, w35, w36 are "a11", "a21", and "a12", "a22", respectively. In this manner, first calculation model M1 expressed by one or more state equations can be converted into second calculation model M2.

Note that conversion for replacing the element of state variable "x(n)" with a hidden node can be defined in a manner similar to the above manner even when the state equation has two or more inputs or outputs, or more than or less than two state variables. In this case, the orders of input "u(n)", output "y(n)", and state variable "x(n)" are equalized in in equations (34) to (40), and the respective orders of matrix "A", "B", "C", and "D" are changed in correspondence with the equalized order.

In the present exemplary embodiment, the number of input nodes Ni1 and Ni2 is determined based on the number of parameters (controlled variable V1 and target value V2) input to first calculation model M1. Moreover, the number of output nodes No1 and No2 is determined based on the number of parameters (manipulated variable V3 and deviation e) output from first calculation model M1. Furthermore, the number of hidden nodes Nh1 to Nh6 is determined based on the number of previous states of one or more transfer functions TF1 or state equations in first calculation model M1. In addition, the number of context nodes Nc1 to Nc4 is determined based on the number of transfer functions TF1 each including delay element "$z^{-1}$". Coefficient w0 between nodes N1 can be calculated by multiplying and adding weights of directed sides while following directions of arrows shown in the figure between two nodes N1 in second conversion model M12.

As described above, conversion system 2 and the conversion method for conversion system 2 determine the number of each of input nodes Ni1 and Ni2, hidden nodes Nh1 to Nh6, context nodes Nc1 to Nc4, and output nodes No1 and No2 of second calculation model M2 based on first calculation model M1. Conversion system 2 and the conversion method for conversion system 2 calculate coefficient w0 between respective nodes N1 of second calculation model M2 based on first calculation model M1. In this manner, conversion system 2 and the conversion method for conversion system 2 can convert first calculation model M1 which is a control algorithm of existing motor 3 into second arithmetic model M2 which executes parallel calculation processing. Therefore, conversion system 2 and the conversion method of the present exemplary embodiment offer following advantages, for example.

Generally, for building a trained model, a combination of the number of respective neurons of input layers, hidden layers, and output layers, and a structure of a neural network for a connection relationship between the neurons, for example, and activation functions used in each of the neurons is determined by trial and error. Weighting coefficients between the neurons are generally machine-learned by backpropagation. In other words, machine learning is necessary to build a trained model. Machine learning requires a huge amount of data (big data) and learning time.

On the other hand, according to conversion system 2 and the conversion method of the present exemplary embodiment, the control algorithm (first calculation model M1) of existing motor 3 is converted into second calculation model M2 which is approximate to a trained model. In this case, machine learning is not required in the present exemplary embodiment. Accordingly, offered is such an advantage that a calculation model approximate to a trained model can be built without requiring big data and learning time.

Furthermore, according to the present exemplary embodiment, machine learning can be also performed based on second calculation model M2 to further improve control accuracy of motor 3. In this case, machine learning from blankness is not needed. Accordingly, offered is such an advantage that a result of machine learning can be quickly obtained.

In addition, according to the present exemplary embodiment, a weighting coefficient obtained as a result of machine learning can be replaced with a parameter of a control algorithm of existing motor 3. Therefore, the present exemplary embodiment offers such an advantage that a result of machine learning can be easily interpreted in light of the control algorithm of existing motor 3 when machine learning is performed.

Furthermore, in the present exemplary embodiment, a calculation model corresponding to a new algorithm can be easily built by adding node N1 to second calculation model M2 even when a new control algorithm based on the control algorithm of existing motor 3 is developed.

(4) Modifications

The exemplary embodiment described above is only one of various exemplary embodiments of the present disclosure. The exemplary embodiment described above can be modified in various ways in accordance with design or the like as long as the object of the present disclosure can be achieved. A function similar to motor control system 1 may be embodied as a computer program, a non-temporary recording medium in which the computer program is recorded, or the like. A function similar to control model conversion system 2 for motor 3 may be embodied as a computer program, a non-temporary recording medium in which the computer program is recorded, or the like.

A control model conversion program for motor 3 according to one aspect (hereinafter also simply referred to as "conversion program") is a conversion program for causing one or more processors to execute a conversion process which converts first calculation model M1 into second arithmetic model M2. First calculation model M1 outputs one or more manipulated variables V3 used for control of motor 3 by receiving an input of the one or more controlled variables V1 or target values V2 each indicating the state of motor 3, and performing calculation that uses one or more transfer functions TF1 or state equations. Second calculation model M2 outputs one or more manipulated variables V3 by receiving an input of one or more controlled variables V1 or target values V2, and performing calculation in each of one or more node layers L1 each including a plurality of nodes N1 that execute calculations in parallel. A conversion process includes a process for determining coefficient w1 multiplied by an input value input to nodes N1, and function f1 designating a multiplied value as an input variable based on one or more transfer functions TF1 or state equations for each of the plurality of nodes N1 in a step of converting first calculation model M1 into second calculation model M2.

In the conversion program, the conversion process includes a following process in the step of converting first calculation model M1 into second calculation model M2.

Specifically, this process determines the number of a plurality of nodes N1, and respective coefficients w1 for the plurality of nodes N1 based on the number of previous states of one or more transfer functions TF1 or state equations in first calculation model M1, and a connection relationship between input and output.

Modifications of the exemplary embodiment described above will be hereinafter listed. The modifications described below may be combined and applied as appropriate.

Motor control system 1 (or conversion system 2) in the present disclosure includes a computer system. The computer system has a main configuration including a processor and a memory as hardware. The function as motor control system 1 (or conversion system 2) in the present disclosure is achieved under a program recorded in the memory of the computer system and executed by the processor. The program may be pre-recorded in the memory of the computer system, may be provided through a telecommunication line, or may be recorded and provided in a non-temporary recording medium such as a memory card, an optical disk, a hard disk drive, or the like that can be read by the computer system. The processor of the computer system is constituted by one or a plurality of electronic circuits including a semiconductor integrated circuit (IC) or a large-scale integrated circuit (LSI, Large Scale Integration). The integrated circuits such as IC and LSI referred to herein have different names depending on the degree of integration, and include integrated circuits called system LSI, VLSI (Very Large Scale Integration), and ULSI (Ultra Large Scale Integration). Furthermore, FPGA (Field Programmable Gate Array) programmed after manufacture of LSI, and a logical device capable of reconfiguring a junction relationship inside LSI or reconfiguring circuit partitions inside LSI can also be adopted as processors. A plurality of electronic circuits may be integrated into one chip, or may be distributed into a plurality of chips. A plurality of chips may be integrated into one device, or may be distributed into a plurality of devices. The computer system referred to herein includes a microcontroller having one or more processors and one or more memories. Therefore, the microcontroller is also constituted by one or a plurality of electronic circuits including a semiconductor integrated circuit or a large-scale integrated circuit.

In addition, the configuration that a plurality of the functions of motor control system 1 (or conversion system 2) are integrated in one housing is not an essential configuration for motor control system 1 (or conversion system 2). That is, the constituent elements of motor control system 1 (or conversion system 2) may be distributed into a plurality of housings. Further, at least a part of the functions of motor control system 1 (or conversion system 2) may be implemented by a cloud (cloud computing) or the like.

Figure 13:
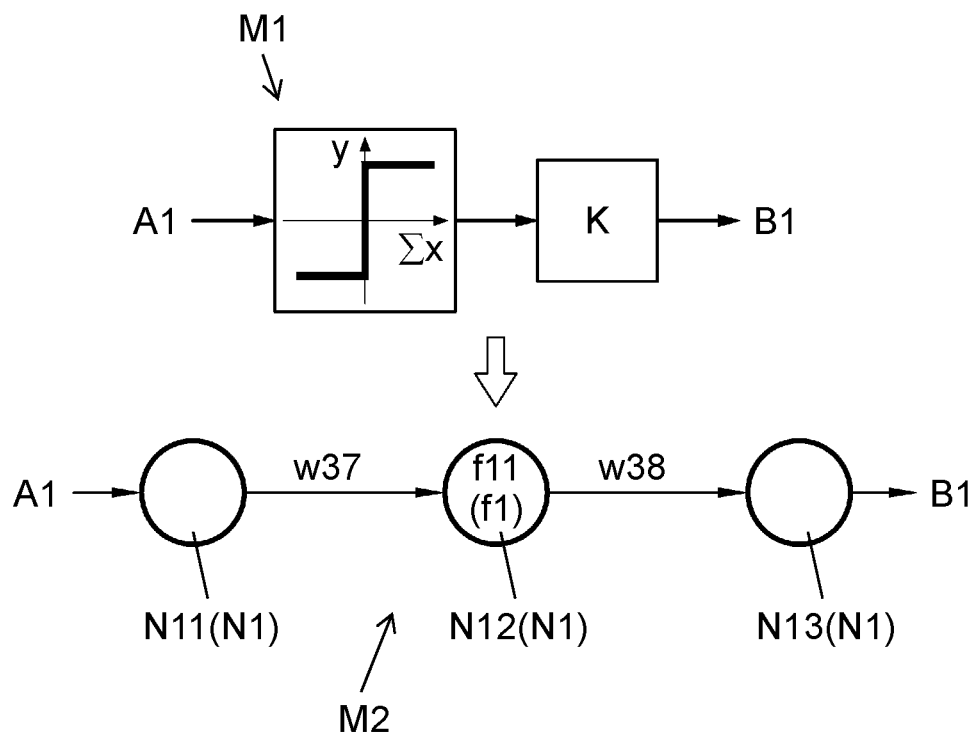
FIG. 13 is a schematic diagram showing an example of a case where the first calculation model including a nonlinear function is converted into the second calculation model in the motor control model conversion system according to the exemplary embodiment of the present disclosure.

Moreover, function f1 may be a non-linear function in one or more nodes N1 in the plurality of nodes N1 included in second calculation model M2. FIG. 13 is a schematic diagram showing an example of a case where a first calculation model including a nonlinear function is converted into a second calculation model in the motor control model conversion system according to the exemplary embodiment of the present disclosure. For example, as shown in FIG. 13, suppose that first calculation model M1 has a process for obtaining output data B1 by multiplying an output value of a sign function designating input data A1 as an input variable by friction coefficient K. Input data A1 herein corresponds to a speed of motor 3, and output data B1 corresponds to friction torque.

In this case, the above process in second calculation model M2 is expressed by three nodes N1 (first node N11, second node N12, and third node N13). First node N11 designates input data A1 as an input value, and outputs the input value without change. In second node N12, step function f11 is specified as function f1. Third node N13 is a node that outputs an input value without change, and designates output data B1 as an output value. Coefficient w37 between first node N11 and second node N12 is "1", while coefficient w38 between second node N12 and third node N13 is "K". In this manner, the process including a nonlinear function (sign function in this example) in first calculation model M1 can be converted into second calculation model M2 using node N1 where a nonlinear function (step function in this example) is specified as function f1.

Moreover, first calculation model M1 may be divided into a plurality of control algorithms. In this case, conversion system 2 and the conversion method may perform conversion into second calculation model M2 for each of the plurality of control algorithms.

Furthermore, in second calculation model M2, not only one layer but also a plurality of layers may be provided as hidden layer L13. In second calculation model M2, not only one layer but also a plurality of layers may be provided as context layer L14.

(Summary)

As described above, a motor control method according to a first aspect inputs one or more controlled variables V1 or target values V2 each representing a state of motor 3 to one or more node layers L1 as an input value, and performs calculation in each of the one or more node layers L1 to output one or more manipulated variables V3 used for control of motor 3 and control output of the motor in accordance with the one or more manipulated variables. One or more node layers L1 each have a plurality of nodes N1 which execute calculations in parallel. Each of the plurality of nodes N1 multiplies the input value by coefficient w0 specified for corresponding node N1, and performs calculation using function f1 specified for corresponding node N1 and designating a multiplied value as an input variable to determine an output value.

According to this aspect, an advantage of reduction of a response time to a command for controlling motor 3 can be offered.

According to a motor control method of a second aspect, in the first aspect, node N1 included in at least one node layer L1 of one or more node layers L1 designates a previous output value of other one node N1 of one or more node layers L1 as the input value.

According to this aspect, an advantage of easy improvement of accuracy of feedback control can be offered.

According to a motor control method of a third aspect, in the first or second aspect, function f1 is a non-linear function.

According to this aspect, offered is an advantage of easy increase in a degree of freedom of control of motor 3 as compared with a case where function f1 is a linear function.

According to a motor control method of a fourth aspect, in any one of the first to third aspects, one or more controlled variables V1 each include at least position information associated with motor 3.

According to this aspect, an advantage of reduction of a time required to shift the position of motor 3 to a desired position can be offered.

A control model conversion method for motor 3 according to a fifth aspect is a conversion method for converting first calculation model M1 into second calculation model M2.

First calculation model M1 outputs one or more manipulated variables V3 used for control of motor 3 by receiving an input of the one or more controlled variables V1 or target values V2 each indicating the state of motor 3, and performing calculation that uses one or more transfer functions or state equations. Second calculation model M2 outputs one or more manipulated variables V3 by receiving an input of one or more controlled variables V1 or target values V2, and performing calculation in each of one or more node layers L1 each including a plurality of nodes N1 that execute calculations in parallel. In a step of converting first calculation model M1 into second calculation model M2, this conversion method determines coefficient w0 multiplied by the input value input to node N1 and function f1 designating a multiplied value as an input variable based on one or more transfer functions or state equations for each of the plurality of nodes N1.

According to this aspect, an advantage of reduction of a response time to a command for controlling motor 3 can be offered by using second calculation model M2 after conversion.

A control model conversion method for motor 3 of a sixth aspect includes, in the fifth aspect, a following method in the step of converting first calculation model M1 into second calculation model M2. Specifically, this method determines the number of a plurality of nodes N1, and respective coefficients w0 for the plurality of nodes N1 based on the number of previous states of one or more transfer functions TF1 or state equations in first calculation model M1, and a connection relationship between input and output.

According to this aspect, an advantage of easy simplification of the step of converting first calculation model M1 into second calculation model M2 can be offered.

Motor control system 1 according to a seventh aspect includes inputter 11 and calculator 12. One or more controlled variables V1 or target values V2 each representing a state of motor 3 are input to inputter 11 as an input value. Calculator 12 includes one or more node layers L1 each having a plurality of nodes N1 that execute calculations in parallel, and outputs one or more manipulated variables V3 used for control of motor 3 by performing calculation based on the input value. Each of the plurality of nodes N1 multiplies the input value by coefficient w0 specified for corresponding node N1, and performs calculation using function f1 specified for corresponding node N1 and designating a multiplied value as an input variable.

According to this aspect, an advantage of reduction of a response time to a command for controlling motor 3 can be offered.

Control model conversion system 2 for motor 3 according to an eighth aspect includes model inputter 21 and converter 22. First calculation model M1 is input to model inputter 21. Converter 22 converts first calculation model M1 into second calculation model M2, and outputs second calculation model M2.

First calculation model M1 outputs one or more manipulated variables V3 used for control of motor 3 by receiving an input of the one or more controlled variables V1 or target values V2 each indicating the state of motor 3, and performing calculation that uses one or more transfer functions TF1 or state equations. Second calculation model M2 outputs one or more manipulated variables V3 by receiving an input of one or more controlled variables V1 or target values V2, and performing calculation in each of one or more node layers L1 each including a plurality of nodes N1 that execute calculations in parallel. In a step of converting first calculation model M1 into second calculation model M2, converter 22 determines coefficient w0 multiplied by the input value input to node N1 and function f1 designating a multiplied value as an input variable based on one or more transfer functions TF1 or state equations for each of the plurality of nodes N1.

According to this aspect, an advantage of reduction of a response time to a command for controlling motor 3 can be offered by using second calculation model M2 after conversion.

According to control model conversion system 2 for motor 3 of a ninth aspect, in the eighth aspect, converter 22 executes a following process in the step of converting first calculation model M1 into second calculation model M2. Specifically, converter 22 determines the number of a plurality of nodes N1, and respective coefficients w0 for the plurality of nodes N1 based on the number of previous states of one or more transfer functions TF1 or state equations in first calculation model M1, and a connection relationship between input and output.

According to this aspect, an advantage of easy simplification of the step of converting first calculation model M1 into second calculation model M2 can be offered.

A control model conversion program for motor 3 according to a tenth aspect is a conversion program for causing one or more processors to execute a conversion process that converts first calculation model M1 into second calculation model M2. First calculation model M1 outputs one or more manipulated variables V3 used for control of motor 3 by receiving an input of the one or more controlled variables V1 or target values V2 each indicating the state of motor 3, and performing calculation that uses one or more transfer functions TF1 or state equations. Second calculation model M2 outputs one or more manipulated variables V3 by receiving an input of one or more controlled variables V1 or target values V2, and performing calculation in each of one or more node layers L1 each including a plurality of nodes N1 that execute calculations in parallel. A conversion process includes a following process in the step of converting first calculation model M1 into second calculation model M2. Specifically, the conversion process includes a process that determines coefficient w0 multiplied by the input value input to node N1 and function f1 designating a multiplied value as an input variable based on one or more transfer functions TF1 or state equations for each of the plurality of nodes N1.

According to this aspect, an advantage of reduction of a response time to a command for controlling motor 3 can be offered by using second calculation model M2 after conversion.

According to a control model conversion program for motor 3 of an eleventh aspect, in the tenth aspect, the conversion process includes a following process in the step of converting first calculation model M1 into second calculation model M2. Specifically, this process determines the number of a plurality of nodes N1, and respective coefficients w0 for the plurality of nodes N1 based on the number of previous states of one or more transfer functions TF1 or state equations in first calculation model M1, and a connection relationship between input and output.

According to this aspect, an advantage of easy simplification of the step of converting first calculation model M1 into second calculation model M2 can be offered.

The configurations according to the second to fourth aspects are not essential configurations for the motor control method, but may be omitted as appropriate. Moreover, the configuration according to the sixth aspect is not an essential configuration for the control model conversion method for motor 3, but may be omitted as appropriate. Furthermore, the configuration according to the ninth aspect is not an essential configuration for control model conversion system 2 for motor 3, but may be omitted as appropriate. In addition, the configuration according to the eleventh aspect is not an essential configuration for the control model conversion program for motor 3, but may be omitted as appropriate.

The invention claimed is:

1. A motor control method that inputs one or more controlled variables or target values each representing a state of a motor to one or more node layers as an input value, and performs calculation in each of the one or more node layers to output one or more manipulated variables used for control of the motor and control the motor in accordance with the one or more manipulated variables, wherein:
   each of the one or more node layers has a plurality of nodes that execute calculations in parallel; and
   each of the plurality of nodes multiplies the input value by a coefficient specified for the corresponding node, and performs calculation using a function specified for the corresponding node and designating a multiplied value as an input variable to determine an output value.

2. The motor control method according to claim 1, wherein the node included in at least one of the one or more node layers designates a previous output value of the node included in another one of the one or more node layers as the input value.

3. The motor control method according to claim 1, wherein the function is a non-linear function.

4. The motor control method according to claim 1 wherein the one or more controlled variables each include at least position information associated with the motor.

5. A motor control model conversion method for converting a first calculation model into a second calculation model, wherein:
   the first calculation model outputs one or more manipulated variables used for control of the motor by receiving an input of one or more controlled variables or target values each indicating a state of the motor, and performing calculation that uses one or more transfer functions or state equations;
   the second calculation model outputs the one or more manipulated variables by receiving an input of the one or more controlled variables or target values, and performing calculation in each of the one or more node layers each including a plurality of nodes that execute calculations in parallel; and
   in a step of converting the first calculation model into the second calculation model, a coefficient multiplied by an input value input to the nodes, and a function designating a multiplied value as an input variable are determined based on the one or more transfer functions or state equations for each of the plurality of nodes.

6. The motor control model conversion method according to claim 5, wherein, in the step of converting the first calculation model into the second calculation model, a number of the plurality of nodes, and the coefficient of each of the plurality of nodes are determined based on a number of previous states of the one or more transfer functions or state equations of the first calculation model, and a connection relationship between the input and the output.

7. A motor control system comprising:
   an inputter that receives one or more controlled variables or target values each indicating a state or a motor as an input value; and
   a calculator that includes one or more node layers each including a plurality of nodes that execute calculations in parallel, and perform calculation based on the input value to output one or more manipulated variables used for control of the motor,
   wherein each of the plurality of nodes multiplies the input value by a coefficient specified for each of the nodes, and performs calculation using a function specified for each of the nodes each designating a multiplied value as an input variable.

8. A motor control model conversion system comprising:
   a model inputter that receives a first calculation model; and
   a converter that converts the first calculation model into a second calculation model, and outputs the second calculation model,
   wherein the first calculation model outputs one or more manipulated variables used for control of the motor by receiving an input of one or more controlled variables or target values each indicating a state of the motor, and performing calculation that uses one or more transfer functions or state equations;
   the second calculation model outputs the one or more manipulated variables by receiving an input of the one or more controlled variables or target values, and performing calculation in each of the one or more node layers each including a plurality of nodes that execute calculations in parallel; and
   in a step of converting the first calculation model into the second calculation model, the converter determines a coefficient multiplied by an input value input to the nodes, and a function designating a multiplied value as an input variable based on the one or more transfer functions or state equations for each of the plurality of nodes.

9. The motor control model conversion system according to claim 8, wherein, in the step of converting the first calculation model into the second calculation model, the converter determines a number of the plurality of nodes, and the coefficient of each of the plurality of nodes based on a number of previous states of the one or more transfer functions or state equations of the first calculation model, and a connection relationship between input and output.

10. A motor control model conversion program for causing one or more processors to execute a conversion process that converts a first calculation model into a second calculation model, wherein:
    the first calculation model outputs one or more manipulated variables used for control of the motor by receiving an input of one or more controlled variables or target values each indicating a state of the motor, and performing calculation that uses one or more transfer functions or state equations;
    the second calculation model outputs the one or more manipulated variables by receiving an input of the one or more controlled variables or target values, and performing calculation in each of the one or more node layers each including a plurality of nodes that execute calculations in parallel; and
    the conversion process includes a process that determines, in a step of converting the first calculation model into the second calculation model, a coefficient multiplied by an input value input to the nodes, and a function designating a multiplied value as an input variable based on the one or more transfer functions or state equations for each of the plurality of nodes.

11. The motor control model conversion program according to claim 10, wherein the conversion process includes a process that determines, in the step of converting the first calculation model into the second calculation model, a number of the plurality of nodes, and the coefficient of each of the plurality of nodes based on a number of previous states of the one or more transfer functions or state equations of the first calculation model, and a connection relationship between input and output.

\* \* \* \* \*